(12) United States Patent
Hashiguchi

(10) Patent No.: US 6,612,648 B1
(45) Date of Patent: Sep. 2, 2003

(54) TRIM COVER ATTACHMENT MEMBER OF VEHICLE SEAT, MANUFACTURING METHOD THEREOF AND VEHICLE SEAT

(75) Inventor: Shuichi Hashiguchi, Shioya-gun (JP)

(73) Assignee: TS Tech Co., Ltd., Asaka (JP)

( * ) Notice: Subject to any disclaimer, the term of this patent is extended or adjusted under 35 U.S.C. 154(b) by 0 days.

(21) Appl. No.: 10/112,870

(22) Filed: Apr. 2, 2002

(30) Foreign Application Priority Data

Feb. 8, 2002 (JP) .......................... 2002-32414

(51) Int. Cl.[7] .............................. A47C 27/00; A47C 7/02
(52) U.S. Cl. ................ 297/218.1; 297/218.2; 297/218.5; 297/452.6
(58) Field of Search ................ 297/218.1, 218.2, 297/218.5, 452.6; 24/633, 634, 716

(56) References Cited

U.S. PATENT DOCUMENTS

| | | | | |
|---|---|---|---|---|
| 3,794,378 A | * | 2/1974 | Haslam et al. | 297/452.6 |
| 3,871,041 A | * | 3/1975 | Plume | 5/402 |
| 3,928,898 A | * | 12/1975 | Smoot | 297/218.1 |
| 3,981,534 A | * | 9/1976 | Wilton | 297/218.1 |
| 4,789,201 A | * | 12/1988 | Selbert | 297/218.1 |
| 5,503,454 A | * | 4/1996 | Sakamoto | 297/218.1 |
| 5,826,939 A | * | 10/1998 | Beyer | 297/218.3 |
| 5,879,051 A | * | 3/1999 | Cozzani | 297/218.3 |
| 5,964,017 A | * | 10/1999 | Roberts | 29/91.1 |
| 5,971,478 A | * | 10/1999 | Hurite | 297/218.3 |
| 6,283,552 B1 | * | 9/2001 | Halse et al. | 297/440.1 |

* cited by examiner

*Primary Examiner*—Peter M. Cuomo
*Assistant Examiner*—Sarah C. Burnham
(74) *Attorney, Agent, or Firm*—Oliff & Berridge, PLC

(57) ABSTRACT

A trim cover attachment member of a vehicle seat, being attached to an end portion of a trim cover, and being engaged with an engaging portion provided at a seat frame of the vehicle seat, comprises: an attachment portion to which the end portion of the trim cover is attached; a hook portion having a hook on an upper end thereof, the hook being engaged with the engaging portion, the hook portion being disposed generally in opposite to the attachment portion; and a bottom portion for connecting a bottom end of the attachment portion and a bottom end of the hook portion. A cut-out portion is formed at a portion of the upper end of the hook portion, and an opening portion is formed at a portion of the attachment portion, in a portion of the trim cover attachment member corresponding to a corner portion of the vehicle seat.

16 Claims, 5 Drawing Sheets

TRIM COVER ATTACHMENT MEMBER OF VEHICLE SEAT, MANUFACTURING METHOD THEREOF AND VEHICLE SEAT

BACKGROUND OF THE INVENTION

1. Field of the Invention

The present invention relates to a trim cover attachment member of a vehicle seat, a manufacturing method thereof and a vehicle seat.

2. Description of Related Arts

In general, as shown in FIG. 5, a vehicle seat 10 or 20 comprises a seat cushion 101 or 201, a seat back 12 provided at the rear side of the seat cushion 101 or 201, or the like. As shown in the longitudinal sectional view in FIG. 6, the seat cushion 101 or 201 comprises a seat frame 2, a pad member 3, a trim cover 4 as a covering member which covers the pad member 3, or the like. A J-shaped hook member 100 or 200 for attachment of the trim cover 4 (hereinafter, a hook member 100 or 200), which is made of resin, is sewn on an end portion 4a of the trim cover 4. The hook member 100 or 200 is engaged with an engaging portion 21 provided at the end portion of the seat frame 2. Thereby, disposing of the end portion 4a of the trim cover 4 is performed.

Incidentally, in the hook member 100 shown in FIG. 7, a plurality of slits 111, 111 . . . are provided at the portion corresponding to the corner portion 101a (c.f. FIG. 5) of the seat cushion 101 by punching, so as to form a slit portion 110. The slits 111, 111 . . . are provided with a length, for example, from the bottom end portion toward the mid-way of the upper end portion in the width direction of the hook member 100. Thereby, when bending is carried out in order to make the slit portion 110 correspond to the corner portion 101a, the slit portion 110 can follow the shape of the corner portion 101a.

Further, the hook member 200 is formed by a metallic core reinforcement 210, and a covering member 220 made of flexible resin such as, vinyl chloride resin or the like. Although no slit is formed at the bottom end portion in the width direction of the hook member 200, slits 211, 211 . . . are formed at the upper end portion of the core reinforcement 210. Therefore, it can follow the shape of the corner portion 201a when bending is performed.

Here, "width direction" is the direction orthogonal to the longitudinal direction of the hook members 100 and 200, that is, the top-to-bottom direction in FIGS. 7 and 8.

However, when the hook member 100 shown in FIG. 7 is covered with the trim cover 4, since there are the slits 111, 111 . . . at the bottom end portion in the width direction of the hook member 100, for example, as shown in FIG. 9, the trim cover 4 is buried into the slits 111, 111 . . . by tension of the trim cover 4 and concave portions 121, 121 . . . are formed. Thereby, the surface of the trim cover 4 in the corner portion 101a is seen uneven, so that there is a problem that it is bad in appearance.

On the other hand, in the case of the hook member 200 shown in FIG. 8, since the whole core reinforcement 210 is covered with the covering member 220, the surface of the trim cover 4 in the corner portion 201a of the seat cushion 20 is not seen uneven when the hook member 200 is covered with the trim cover 4, so that there is no problem in appearance. However, since two materials, the core reinforcement 210 and the covering member 220, are formed integrally, there is a problem that the cost becomes high compared with the above-mentioned hook member 100.

SUMMARY OF THE INVENTION

The present invention was made in view of the above-described problems. An object of the present invention is to provide a trim cover attachment member of a vehicle seat, a manufacturing method thereof and a vehicle seat, which can improve quality of appearance in the corner portion of the vehicle seat when a trim cover attachment member of a vehicle seat is covered with a trim cover, and which can prevent cost rise.

In order to solve the above-described problems, according to a first aspect of the present invention, a trim cover attachment member of a vehicle seat, being attached to an end portion of a trim cover, and being engaged with an engaging portion provided at a seat frame of the vehicle seat, comprises: an attachment portion to which the end portion of the trim cover is attached; a hook portion having a hook on an upper end thereof, the hook being engaged with the engaging portion, the hook portion being disposed generally in opposite to the attachment portion; and a bottom portion for connecting a bottom end of the attachment portion and a bottom end of the hook portion. A cut-out portion is formed at a portion of the upper end of the hook portion, and an opening portion is formed at a portion of the attachment portion, in a portion of the trim cover attachment member corresponding to a corner portion of the vehicle seat.

Preferably, a plurality of the cut-out portions and the opening portions are provided in succession along a longitudinal direction of the trim cover attachment member. Further, the cut-out portion and the opening portion may be formed by punching.

More preferably, the attachment portion, the hook portion, and the bottom portion are formed integrally. Further, the bottom portion may be formed continuously along a longitudinal direction of the trim cover attachment member.

Moreover, a shape of the opening portion may be one of a round shape, a square shape, and a slit shape. In addition, the attachment portion, the hook portion, and the bottom portion are preferably made of synthetic resin.

According to the present invention, when bending is performed to the trim cover attachment member along the corner portion of the seat frame, the difference of volume of deformation caused by the difference between the radius of curvature of the attachment portion and the hook portion is absorbed by the cut-out portion and the opening portion which is formed at a portion of the attachment portion. Thereby, the followability of the shape of the corner portion can be maintained. Simultaneously, since the bottom portion is preferable to have a continuous shape, unevenness on the surface by tension of the trim cover cannot be seen when the trim cover attachment member is covered with the trim cover. Therefore, quality of appearance in the corner portion of the vehicle seat can be improved.

Furthermore, as in general, the cut-out portion and the opening portion may be formed by punching, manufacturing cost of the trim cover attachment member does not rise.

Further, in the present invention, since a plurality of the cut-out portions and the opening portions are preferably provided along the longitudinal direction of the trim cover attachment member, degree of freedom of radius of curvature of the corner portion to which the trim cover attachment member can follow becomes high. In other words, range of radius of curvature of the corner portion to which the trim cover attachment member may become wider.

According to a second aspect of the present invention, a vehicle seat comprises: a trim cover; a seat frame having an engaging portion; and a trim cover attachment member being attached to an end portion of the trim cover, and being engaged with the engaging portion of the seat frame. The trim cover attachment member comprises: an attachment portion to which the end portion of the trim cover is attached; a hook portion having a hook on an upper end thereof, the hook being engaged with the engaging portion, the hook portion being disposed generally in opposite to the attachment portion; and a bottom portion for connecting a bottom end of the attachment portion and a bottom end of the hook portion. A cut-out portion is formed at a portion of the upper end of the hook portion, and an opening portion is formed at a portion of the attachment portion, in a portion of the trim cover attachment member corresponding to a corner portion of the vehicle seat.

Preferably, a plurality of the cut-out portions and the opening portions are provided in succession along a longitudinal direction of the trim cover attachment member. Further, the cut-out portion and the opening portion may be formed by punching.

More preferably, the attachment portion, the hook portion, and the bottom portion are formed integrally. Further, the bottom portion may be formed continuously along a longitudinal direction of the trim cover attachment member.

Moreover, a shape of the opening portion may be one of a round shape, a square shape, and a slit shape. In addition, The attachment portion, the hook portion, and the bottom portion are preferably made of synthetic resin.

According to the vehicle seat, the same effect as the above-described first aspect of the present invention can be obtained.

According to a third aspect of the present invention, a method for manufacturing a trim cover attachment member of a vehicle seat, the trim cover attachment member being attached to an end portion of a trim cover and being engaged with an engaging portion provided at a seat frame of the vehicle seat, comprises: forming an attachment portion to which the end portion of the trim cover is attached, a hook portion having a hook for being engaged with the engaging portion on an upper end thereof, the hook portion being disposed generally in opposite to the attachment portion, and a bottom portion for connecting a bottom end of the attachment portion and a bottom end of the hook portion; and forming a cut-out portion at a portion of the upper end of the hook portion and an opening portion at a portion of the attachment portion, in a portion of the trim cover attachment member corresponding to a corner portion of the vehicle seat.

Preferably, the cut-out portion and the opening portion are formed by punching.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

PREFERRED EMBODIMENT OF THE INVENTION

Hereinafter, embodiments of the trim cover attachment member and the vehicle seat according to the present invention will be explained with reference to FIGS. 1 to 4.

Figure 1:
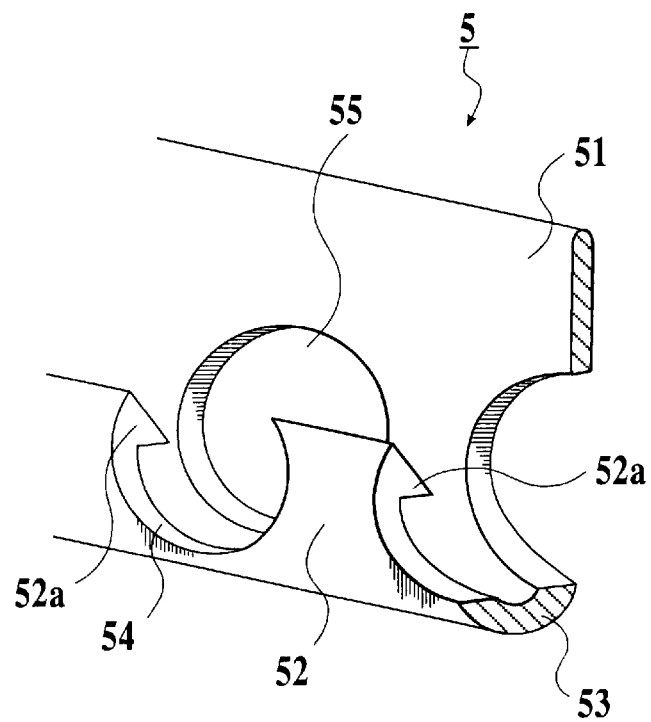
FIG. 1 is a perspective view showing a principal portion of a trim cover attachment member as an example of a trim cover attachment member to which the present invention is applied.
Figure 2:
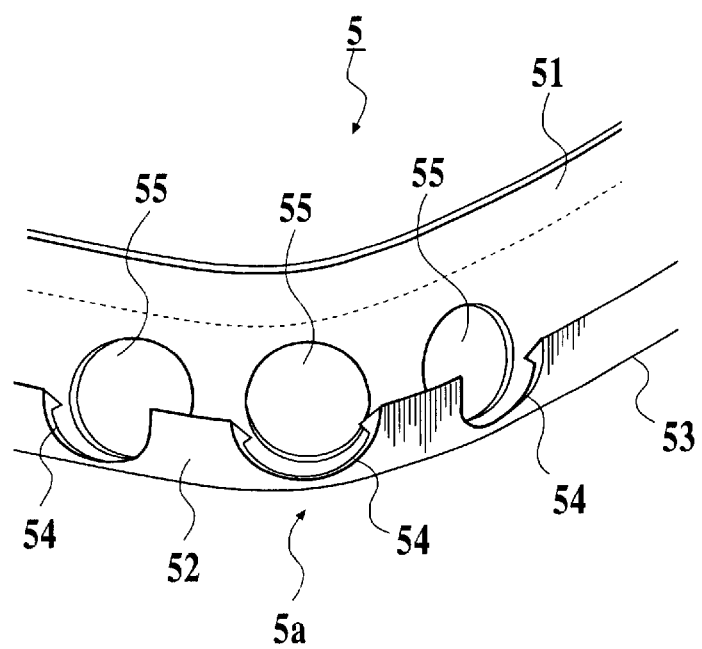
FIG. 2 is a perspective view showing a condition that bending if performed to the trim cover attachment member shown in FIG. 1.

FIG. 1 is a perspective view showing a principal portion of a trim cover attachment member as an example of a trim cover attachment member to which the present invention is applied. FIG. 2 is a perspective view showing a state that bending is performed to the trim cover attachment member shown in FIG. 1.

In the embodiment of the present invention, a seat cushion to which the trim cover attachment member is applied is explained as an example of a vehicle seat. Further, the structure of the same portions as the seat cushions 101 and 201 will be explained by using FIGS. 5 and 6.

Figure 5:
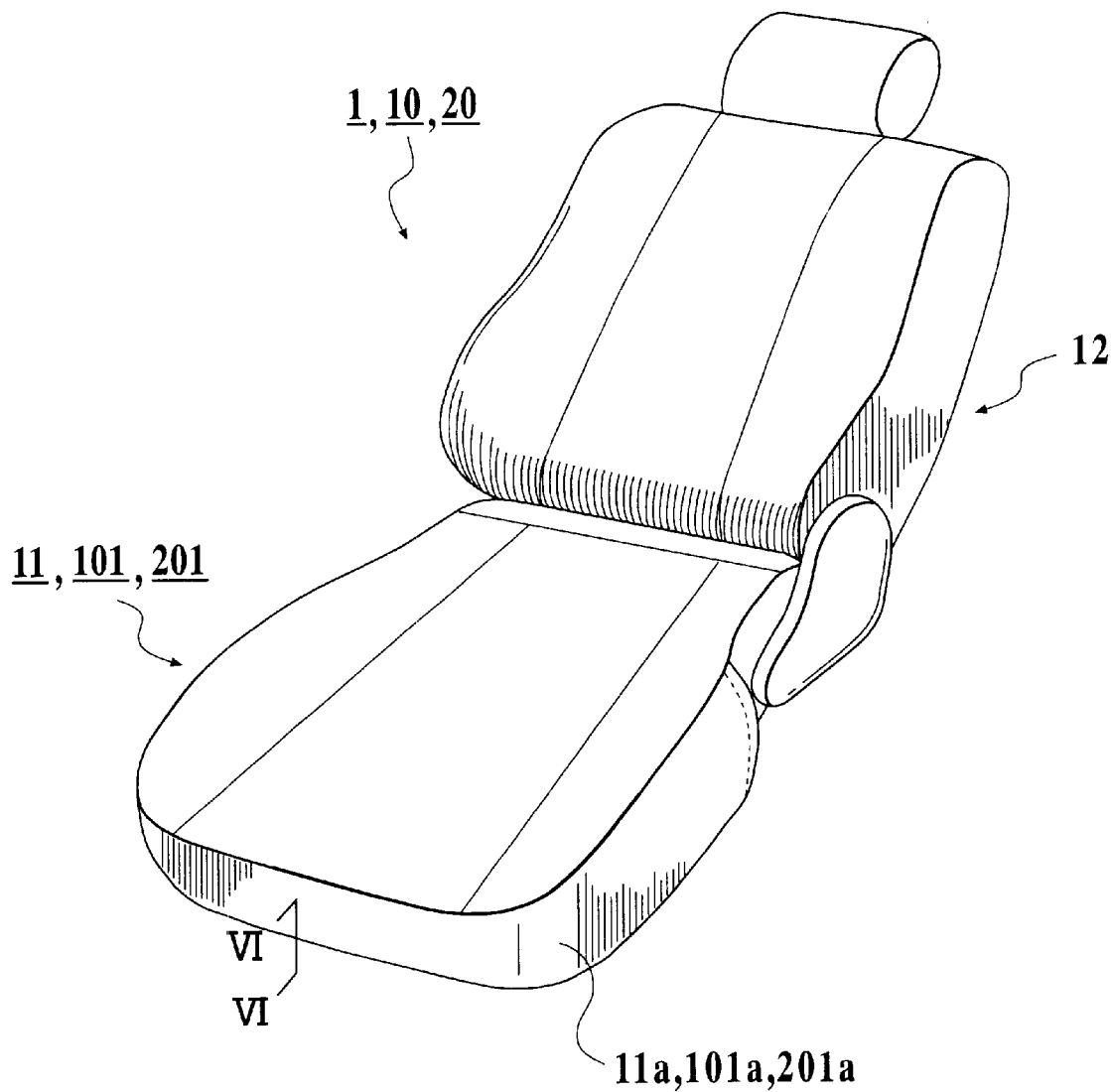
FIG. 5 is a perspective view showing an appearance of a seat cushion.
Figure 6:
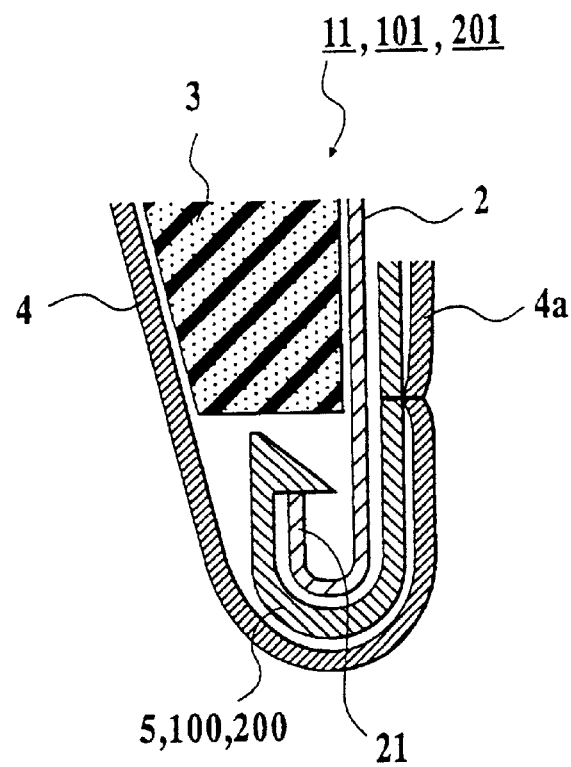
FIG. 6 is a cross sectional view showing VI–VI portion in FIG. 5.
Figure 7:
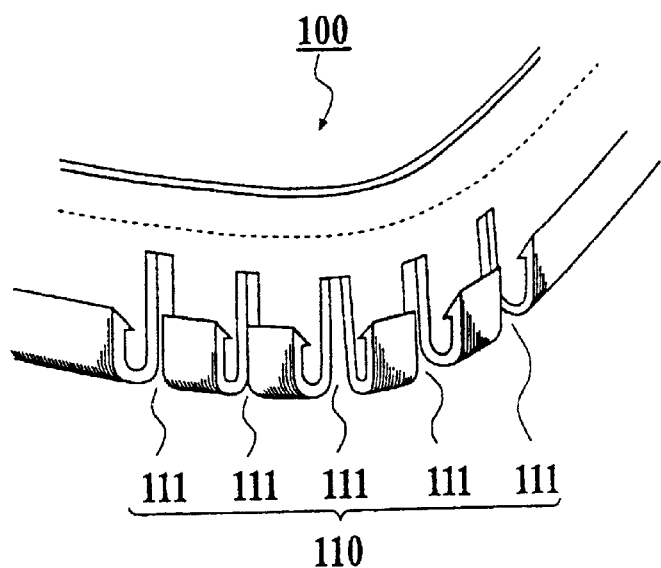
FIG. 7 is a perspective view showing a slit portion of a hook member in earlier technology.
Figure 8:
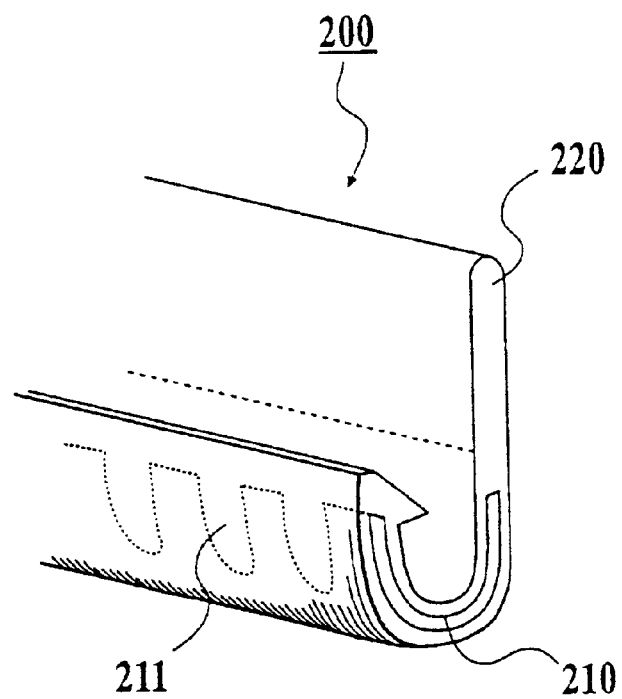
FIG. 8 is a perspective view showing another hook member in earlier technology.
Figure 9:
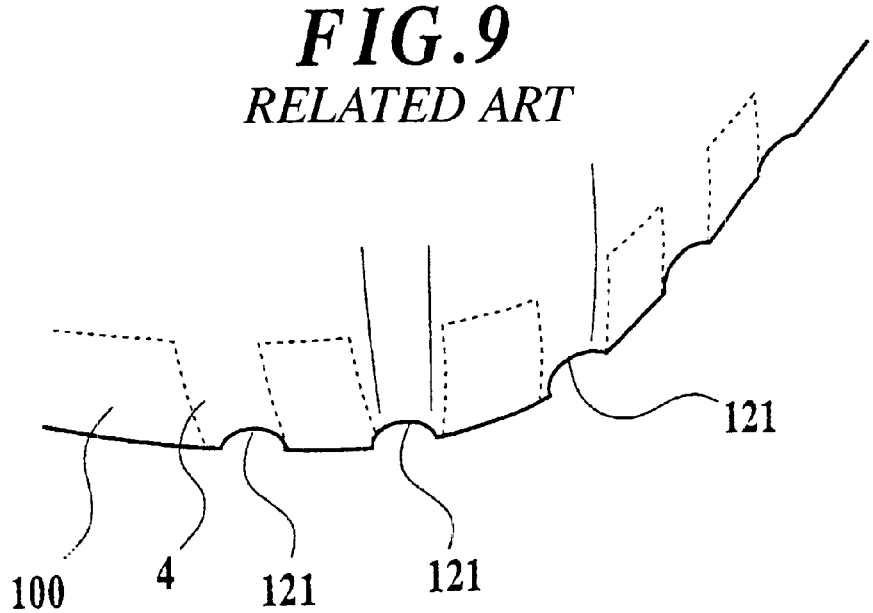
FIG. 9 is a perspective view showing a condition that the hook member in FIG. 7 is covered with a trim cover.

As shown in FIG. 5, a vehicle seat 1 according to the embodiment of the present invention comprises a seat cushion 11, a seat back 12 or the like. As shown in FIG. 6, the seat cushion 11 comprises a seat frame 2, a pad member 3 for being attached to the seat frame 2, a trim cover 4 for covering the pad member 3, or the like.

As shown in FIG. 6, an edge portion of the seat frame 2 is projected in comparison with the pad member 3. In the projected edge portion, an engaging portion 21 which is bent in U-shape is formed.

At the end portion 4a of the trim cover 4, a J-shaped hook member 5 as a trim cover attachment member is sewn.

As shown in FIG. 1, the hook member 5 comprises integrally an attachment portion 51 on which the end portion 4a of the trim cover 4 is sewn, a hook portion 52 which is disposed generally in opposite to the attachment portion 51, and a bottom portion 53 which connects the bottom end of the attachment portion 51 and the bottom end of the hook portion 52. Further, hooks 52a, 52a . . . for being engaged with the engaging portion 21 are provided at the upper end of the hook portion 52.

Since the hook member 5 is disposed along the outer peripheral of the seat frame 2, it has a shape which can fit to the contour of the seat frame 2. In the position corresponding to the corner portion 11a of the seat cushion 11, a generally same corner portion 5a as shown in FIG. 2 is formed.

In the portion corresponding to the corner portion 5a of the hook member 5, cut-out portions 54, 54 . . . and round opening portions 55, 55 . . . are formed. The cut-out portions 54, 54 . . . are formed by cutting out the upper end of the hook portion 52, and the opening portions 55, 55 . . . are formed by punching a portion of the attachment portion 51 where the cut-out portions 54, 54 . . . are reflected. The cut-out portions 54, 54 . . . and the opening portions 55, 55

... are formed by punching, and a plurality of them are provided along the longitudinal direction of the hook member 5 in a predetermined interval.

Then, as shown in FIG. 2, when bending is performed in order to form the corner portion 5a, the cut-out portions 54, 54 . . . absorb the difference of volume of deformation caused by difference in radius of curvature of the attachment portion 51 and the hook portion 52. Thereby, followability of the shape of the corner portion 5a can be maintained. That is, since the cut-out portions 54, 54 . . . are formed at the upper end of the hook portion 52, the hook member 5 can be prevented from being bad in shape, which occurs on the basis of the difference of volume of deformation caused by the difference in the radius of curvature of the attachment portion 51 and the hook portion 52.

Further, since the bottom portion 53 is not punched, it has a continuous shape. Therefore, when the hook member 5 is covered with the trim cover 4, unevenness by the tension of the trim cover 4 does not appear on the surface, and a product which has good quality of appearance can be provided.

Next, a method for manufacturing the above-described hook member 5 will be explained.

At first, a long molded body (not shown in the figure) is made by extrusion molding or injection molding a synthetic resign, for example, polypropylene, polyethylene or the like. Next, a portion of the molded body corresponding to the corner portion 1a of the seat cushion 1 is punched by punching, so that the cut-out portions 54, 54 . . . and the opening portions 55, 55 . . . are formed. Then, the molded body is bent in the shape along the outer peripheral portion of the seat frame 2. In this case, since the cut-out portions 54, 54 . . . are formed in the corner portion 5a, the cut-out portions 54, 54 . . . absorb the difference of volume of deformation caused by the difference in the radius of curvature of the attachment portion 51 and the hook portion 52. Thereby, followability of the shape of the corner portion 5a can be maintained.

The quality of appearance in the corner portion 11a of the seat cushion 11 of the vehicle seat 1 can be improved without rising the manufacturing cost, by disposing of the end of the trim cover 4 if performed by using the hook member 5 according to the present invention as explained above.

Similarly, the vehicle seat 1 to which the hook member 5 according to the present invention is applied can improve the quality of appearance in the corner portion 11a without rising the manufacturing cost.

Further, since pluralities of the cut-out portions 54, 54 . . . and the opening portions 55, 55 . . . are provided in succession along the longitudinal direction of the hook member 5, the range of curvature of the corner portion 5a that the hook member 5 can follow becomes more wide.

In addition, the present invention is not limited to the structure of the above-described embodiment.

Figure 3:
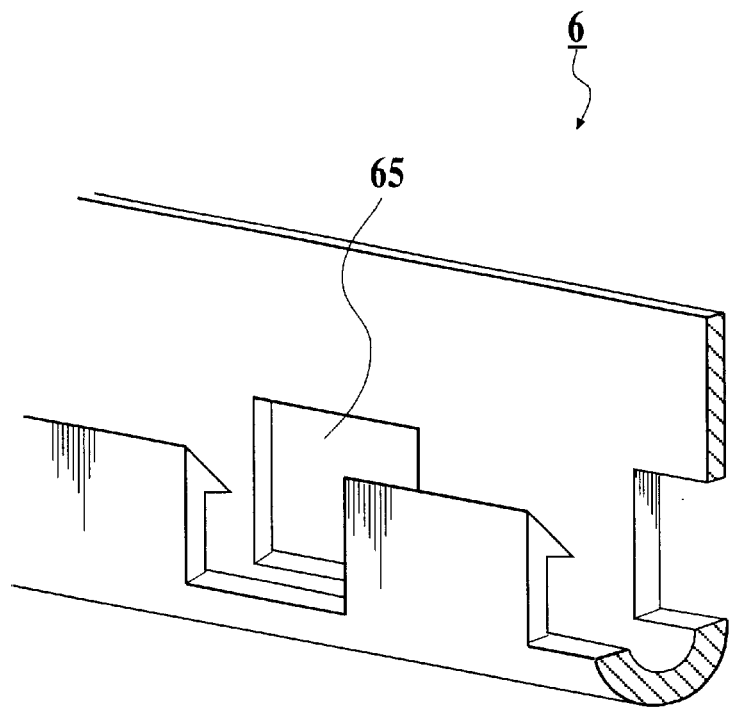
FIG. 3 is a perspective view showing a first modification of a opening portion of a hook member.
Figure 4:
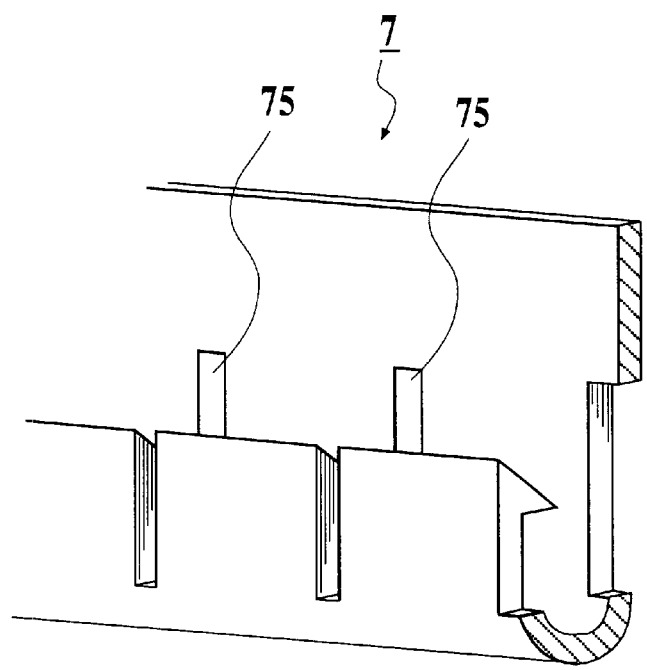
FIG. 4 is a perspective view showing a second modification of a opening portion of a hook member.

For example, the shape of the opening portions formed by punching is not limited to those of round shape. For example, it may be a square socket shape such as, a opening portion 65 of a hook member 6 as shown in FIG. 3, or it may be a slit shape such as, opening portions 75 and 75 of a hook member 7 as shown in FIG. 4. That is, it may be punched in any shape as long as continuity of the bottom portion 53 is maintained when punching is performed.

Further, the hook member is not limited to resin. It may be made of metal.

Moreover, it is needless to say that the concrete detail structures or the like can be changed suitably.

What is claimed is:

1. A trim cover attachment member of a vehicle seat, being attached to an end portion of a trim cover, and being engaged with an engaging portion provided at a seat frame of the vehicle seat, comprising:

an attachment portion to which the end portion of the trim cover is attached, the attachment portion having a face continuous in a longitudinal direction of the trim cover attachment member, the continuous face being for attaching the end portion of the trim cover which covers approximately the whole trim cover attachment member;

a hook portion having a hook on an upper end thereof, the hook being engaged with the engaging portion, the hook portion being disposed generally facing the attachment portion; and a bottom portion for connecting a bottom end of the attachment portion and a bottom end of the hook portion;

wherein a cut-out portion is formed at a portion of the upper end of the hook portion, and an opening portion is formed at a portion of the attachment portion, in a portion of the trim cover attachment member corresponding to a comer portion of the vehicle seat.

2. The trim cover attachment member of the vehicle seat as claimed in claim 1, wherein a plurality of the cut-out portions and the opening portions are provided in succession along the longitudinal direction of the trim cover attachment member.

3. The trim cover attachment member of the vehicle seat as claimed in claim 1, wherein the cut-out portion and the opening portion are formed by punching.

4. The trim cover attachment member of the vehicle seat as claimed in claim 1, wherein the attachment portion, the hook portion, and the bottom portion are formed integrally.

5. The trim cover attachment member of the vehicle seat as claimed in claim 1, wherein the bottom portion is formed continuously along the longitudinal direction of the trim cover attachment member.

6. The trim cover attachment member of the vehicle seat as claimed in claim 1, wherein a shape of the opening portion is one of a round shape, a square shape, and a slit shape.

7. The trim cover attachment member of the vehicle seat as claimed in claim 1, wherein the attachment portion, the hook portion, and the bottom portion are made of synthetic resin.

8. A vehicle seat comprising:

a trim cover;

a seat frame having an engaging portion; and a trim cover attachment member being attached to an end portion of the trim cover, and being engaged with the engaging portion of the seat frame;

the trim cover attachment member comprising:

an attachment portion to which the end portion of the trim cover is attached, the attachment portion having a face continuous in a longitudinal direction of the trim cover attachment member, the continuous face being for attaching the end portion of the trim cover which covers approximately the whole trim cover attachment member;

a hook portion having a hook on an upper end thereof, the hook being engaged with the engaging portion, the hook portion being disposed generally facing the attachment portion; and a bottom portion for connecting a bottom end of the attachment portion and a bottom end of the hook portion;

wherein a cut-out portion is formed at a portion of the upper end of the hook portion, and an opening portion is formed at a portion of the attachment portion, in a portion of the trim cover attachment member corresponding to a corner portion of the vehicle seat; and wherein a surface of the trim cover attached to the trim cover attachment member is smooth.

9. The vehicle seat as claimed in claim 8, wherein a plurality of the cut-out portions and the opening portions are provided in succession along the longitudinal direction of the trim cover attachment member.

10. The vehicle seat as claimed in claim 8, wherein the cut-out portion and the opening portion are formed by punching.

11. The vehicle seat as claimed in claim 8, wherein the attachment portion, the hook portion, and the bottom portion are formed integrally.

12. The vehicle seat as claimed in claim 8, wherein the bottom portion is formed continuously along the longitudinal direction of the trim cover attachment member.

13. The vehicle seat as claimed in claim 8, wherein a shape of the opening portion is one of a round shape, a square shape, and a slit shape.

14. The vehicle seat as claimed in claim 8, wherein the attachment portion, the hook portion, and the bottom portion are made of synthetic resin.

15. A method for manufacturing a trim cover attachment member of a vehicle seat, the trim cover attachment member being attached to an end portion of a trim cover and being engaged with an engaging portion provided at a seat frame of the vehicle seat, comprising:

forming an attachment portion to which the end portion of the trim cover is attached, the attachment portion having a face continuous in a longitudinal direction of the trim cover attachment member, the continuous face being for attaching the end portion of the trim cover which covers approximately the whole trim cover attachment member, a hook portion having a hook for being engaged with the engaging portion on an upper end thereof, the hook portion being disposed generally facing the attachment portion, and a bottom portion for connecting a bottom end of the attachment portion and a bottom end of the hook portion; and forming a cut-out portion at a portion of the upper end of the hook portion and an opening portion at a portion of the attachment portion, in a portion of the trim cover attachment member corresponding to a corner portion of the vehicle seat.

16. The method for manufacturing a trim cover attachment member of a vehicle seat as claimed in claim 15, wherein the cut-out portion and the opening portion are formed by punching.

\* \* \* \* \*